UNITED STATES PATENT OFFICE.

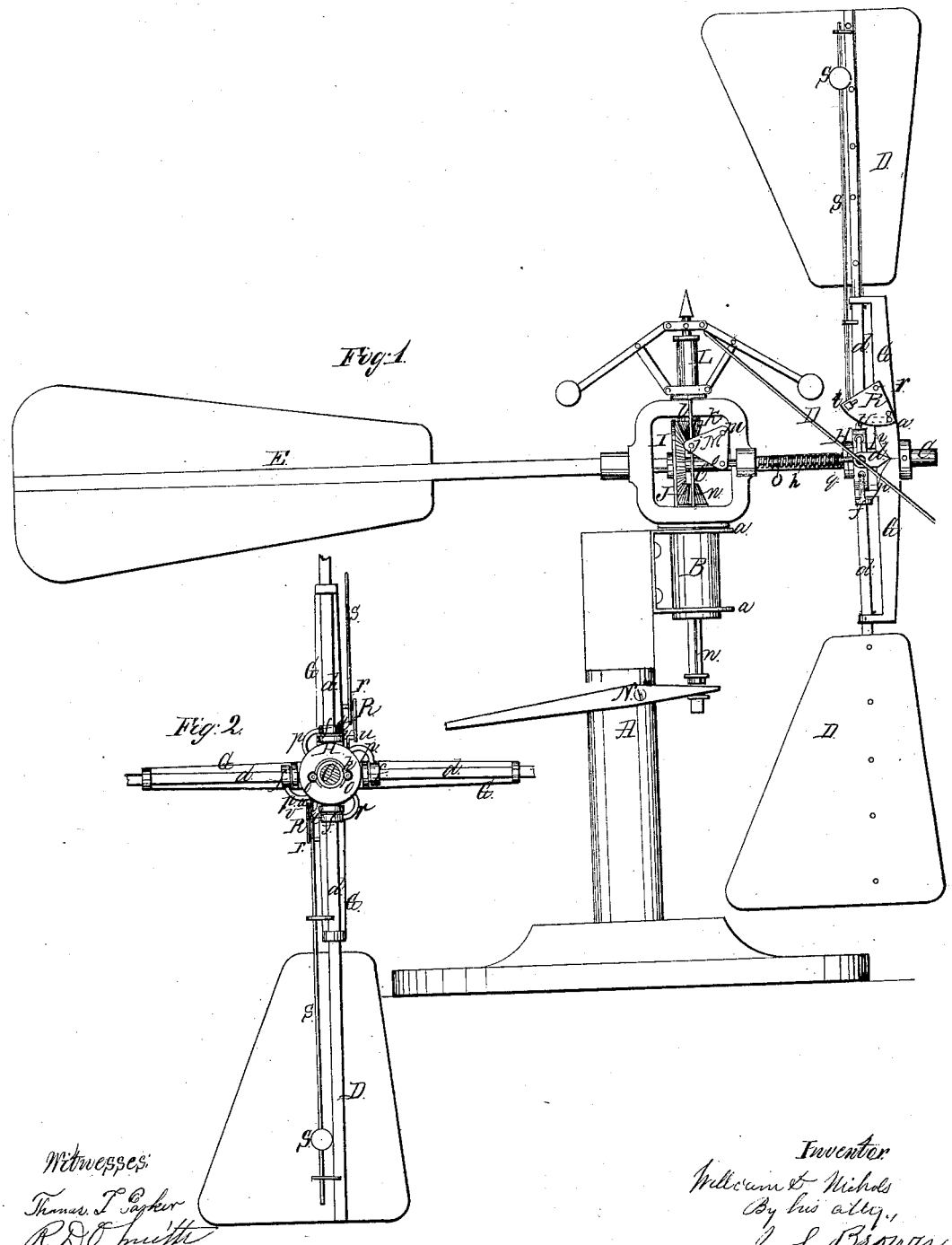

WILLIAM D. NICHOLS, OF CHICAGO, ILLINOIS.

*Letters Patent No. 60,927, dated January 1, 1867.*

IMPROVEMENT IN WINDMILLS.

*The Schedule referred to in these Letters Patent and making part of the same.*

TO ALL WHOM IT MAY CONCERN:

Be it known that I, WILLIAM D. NICHOLS, of Chicago, in the county of Cook, and State of Illinois, have invented an Improved Windmill; and I do hereby declare that the following is a full and exact description thereof, reference being had to the accompanying drawings, making part of this specification—

Figure 1 being a side elevation of a windmill provided with my improvements.

Figure 2, a rear view of a portion of the sails, the shaft thereof being in cross-section.

Like letters designate corresponding parts in both figures.

Letter A represents the support or standard of a windmill; B, the spindle, on which it veers; C, the horizontal driving-shaft, to which the sails D D are attached; and E, the vane, which turns the sails to the direction of the wind. A bevel cog-wheel, I, on the driving-shaft, gears into a bevel pinion, J, below, by which the power is transmitted to the machinery; and also gears into a bevel pinion, K, above, by which a governor, L, is revolved. The sails D D, are attached respectively to spindles $d\,d$, which turn or vibrate in bearings of radial arms G G, secured fast to the driving-shaft C. The turning movement allowed to the sails hereby, should be sufficient to vary the angle of the sails to the wind to the extent required. In order to govern the position of the sails, thus, according to the force of the wind or the variations of power required, I employ, as an intermediate regulator, a sliding-head, H, which is situated on the driving-shaft just behind the sails, and which, by its sliding movements thereon, varies the angle of the sails to the wind as much as required. The control of the sails by the movement of the sliding-head is effected by means of cranks $p\,p$, provided with sockets $f\,f$, by which they are attached to the spindles of the sails. The projecting or free end of the cranks simply enter and turn freely in pivot holes formed in the sliding-head H, at regular intervals around the circumference thereof, substantially as represented in the drawings. And since the crank-sockets are fixed firmly to the said spindles, the cranks turn therewith in their bearings on the arms G G, while the free or projecting ends of the cranks, being pivoted in peripheral holes of the sliding-head, are moved in and out therewith, and thereby turn all the sails simultaneously and equally. These cranks may be made of cast iron, and there is no fitting necessary, their ends simply entering the holes in the periphery of the sliding-head, as they are mounted and secured on the sail spindles. Thus not only do I secure the most simple and effective means of connecting the sliding-head with the sails without intermediate devices, but make the construction cheap and simple. This sliding-head is pressed up toward the sails by a spiral spring or springs, O, around or by the side of the driving-shaft C, and the force of this spring determines the resistance which the sails offer to the wind against its turning them edgewise. By varying the strength of the spring or springs, the sails will be adapted to a greater or less pressure of wind or to greater or less power to be applied to do the work. By employing a pin, $q$, projecting from the shaft or rod, between the coils of the surrounding spring, the number of coils put in action against the sliding-head can readily be varied by turning the spring on the pin, which will thereby be caused to travel between the coils of the spring, and thus the sails are adjusted in a simple manner sufficient for small windmills for doing light work. But I employ a governor or governors, in connection with the sliding-head H, so as to automatically vary the inclination of the sails as the force of the wind varies or as the work to be done requires more or less power. In this connection, I use a peculiar governor upon the sails themselves for governing their inclination. This governor consists of a ball or weight, S, one for each or every other sail, D, each being attached to a radial rod, $s$, which slides in or out in suitable bearings on the sails. The faster the motion of the sails the greater the centrifugal action of these balls or weights, and *vice versa*. Hence, by making a suitable connection between the weights S S and the sliding-head, this variation in centrifugal force will control the angle of the sails. Such a connection I form by means of a quadrant arm, R, pivoted at $r$, connected with the weight-rod $s$ at $t$, and at $u$ with the connecting-rod $v$, which is pivoted also to the sliding-head. There is a similar connection between the sliding-head and the governor weight of each sail; and thus, all the weights combine to control the sails. If this governor does not fully control the sails under great variations of wind and of work to be done, I employ another governor L of ordinary construction. This also is connected with the sliding-head H, by a connecting-rod, $l$, and a quadrant, M, pivoted at $m$, the rod being pivoted to it at $j$; and a connecting-rod, $h$, pivoted at $o$ to the quadrant, and extending thence to the sliding-head. Another rod $n$ extends from the quadrant M down to a hand-lever, N, by which the attendant can directly control the sails or stop their motion.

What I claim as my invention, and desire to secure by Letters Patent, is—

The combination of the sail cranks *p p*, and sliding-head H, constructed, arranged, and operating as and for the purpose herein specified.

I also claim the adjustment of the force of the counter-spring or springs O, by means of the fixed pin or pins *q*, and the turning of the spring itself, or the equivalent thereof, substantially as and for the purpose herein set forth.

I also claim the arrangement of the governor weights S S, attached to radial sliding-rods on the sails themselves, and connected by means of the quadrant arms R R, and connecting-rods *v v*, or their equivalents, with the regulating sliding-head H, substantially as herein described.

The above specification of my improved windmill signed by me this day of February, 1866.

WILLIAM D. NICHOLS.

Witnesses:
CHAS. H. BARMM,
H. B. STEVENS.